United States Patent
Binotto et al.

(10) Patent No.: US 10,761,495 B2
(45) Date of Patent: Sep. 1, 2020

(54) DYNAMIC AND RECONFIGURABLE SYSTEM MANAGEMENT

(71) Applicant: International Business Machines Corporation, Armonk, NY (US)

(72) Inventors: Alecio Pedro Delazari Binotto, Sao Paulo (BR); Ricardo Luis Ohta, Sao Paulo (BR); Ademir Ferreira Da Silva, Sao Paulo (BR); Fabio Latuf Gandour, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/974,032

(22) Filed: Dec. 18, 2015

(65) Prior Publication Data

US 2017/0176958 A1    Jun. 22, 2017

(51) Int. Cl.
  *G05B 13/04*  (2006.01)
  *B60W 30/182*  (2020.01)
  *G01S 13/02*  (2006.01)

(52) U.S. Cl.
  CPC ......... *G05B 13/041* (2013.01); *B60W 30/182* (2013.01); *G01S 13/02* (2013.01)

(58) Field of Classification Search
  CPC ............... G05B 13/041; G06F 17/5009; G06F 2217/08; G06N 7/005; H04L 41/147; H04L 43/045; H04W 4/006
  See application file for complete search history.

(56) References Cited

U.S. PATENT DOCUMENTS

| 6,801,878 B1* | 10/2004 | Hintz | H04L 41/00 |
|  |  |  | 702/188 |
| 7,130,757 B2* | 10/2006 | Corwin | G08C 17/00 |
|  |  |  | 702/127 |
| 8,759,734 B2* | 6/2014 | Barrilleaux | G05D 25/02 |
|  |  |  | 250/205 |
| 2007/0208497 A1* | 9/2007 | Downs | G08G 1/0104 |
|  |  |  | 701/117 |

(Continued)

OTHER PUBLICATIONS

"Readings for Session 4, Subset of a Set", Minnesota State University Moorhead, p. 1.*

(Continued)

*Primary Examiner* — Santosh R Poudel
(74) *Attorney, Agent, or Firm* — Harrington & Smith

(57) ABSTRACT

In response to receiving an input of a user criteria for operating a system, one or more predictive models are selected in dependence on the user criteria. The predictive models predict behavior of the system and are stored in the memory with one or more system performance models that control operation of the system. The selected performance model(s) is implemented to select a subset of sensors that monitor physical conditions of the system and/or environmental parameters thereof, and is also used to select one or more of the system performance models that conform to the user criteria. One or more actuators associated with the system are controlled according to inputs received from the selected subset of sensors and the selected performance model(s). The same concepts are valid for other areas rather than maintenance, like optimization in the area of the internet of things, dynamic system reconfiguration, preventive healthcare.

20 Claims, 7 Drawing Sheets

(56) References Cited

U.S. PATENT DOCUMENTS

| | | | | |
|---|---|---|---|---|
| 2010/0214417 A1* | 8/2010 | Gennari | ........... | G08B 13/19645 |
| | | | | 348/159 |
| 2010/0289643 A1* | 11/2010 | Trundle | ................ | G08C 19/16 |
| | | | | 340/545.1 |
| 2011/0087988 A1* | 4/2011 | Ray | ........................ | G06Q 10/06 |
| | | | | 715/771 |
| 2011/0307112 A1* | 12/2011 | Barrilleaux | ............ | H05B 37/02 |
| | | | | 700/291 |
| 2012/0050025 A1* | 3/2012 | Hoeffel | ................. | B60Q 9/007 |
| | | | | 340/435 |
| 2013/0268242 A1* | 10/2013 | Ferre | ................. | G01N 33/0075 |
| | | | | 702/188 |
| 2015/0149017 A1* | 5/2015 | Attard | ................ | B60W 30/182 |
| | | | | 701/23 |
| 2015/0274177 A1* | 10/2015 | Payne | ................ | B60H 1/00771 |
| | | | | 701/1 |
| 2015/0301617 A1* | 10/2015 | Walley | .................... | G06F 3/017 |
| | | | | 345/158 |
| 2016/0039411 A1* | 2/2016 | Park | ........................ | G01S 13/87 |
| | | | | 701/70 |
| 2016/0202074 A1* | 7/2016 | Woodard | ............. | G06Q 10/047 |
| | | | | 701/465 |

OTHER PUBLICATIONS

Industrial Wireless Sensor Networks: Challenges, Design Principles, and Technical Approaches Vehbi C. Gungor, Member, IEEE, and Gerhard P. Hancke, Senior Member, IEEE, IEEE Transactions on Industrial Electronics, vol. 56, No. 10, Oct. 2009, (pp. 4258-4265).

A review on machinery diagnostics and prognostics implementing condition-based maintenance, Mechanical Systems and Signal Processing, Mechanical Systems and Signal Processing 20 (2006) 1483-1510.

Jay Lee, Prognostics and health management design for rotary machinery systems—Reviews,methodology and applications, Mechanical Systems and Signal Processing 42 (2014 )314-334.

Kamran Khakpour, Industrial Control using Wireless Sensor Networks, (5 pages).

Kay Soon Low, Wireless Sensor Networks for Industrial Environments, (2005), (6 pages).

Wireless Sensor Networks for Industrial Applications, Proceedings of the 5lh World Congress on Intelligent Control and Automation. Jun. 15-19, 2004, Hangzhou, P.R. China, (pp. 3636-3640).

Masato Yamaji, Wireless Sensor Network for Industrial Automation (1 page).

* cited by examiner

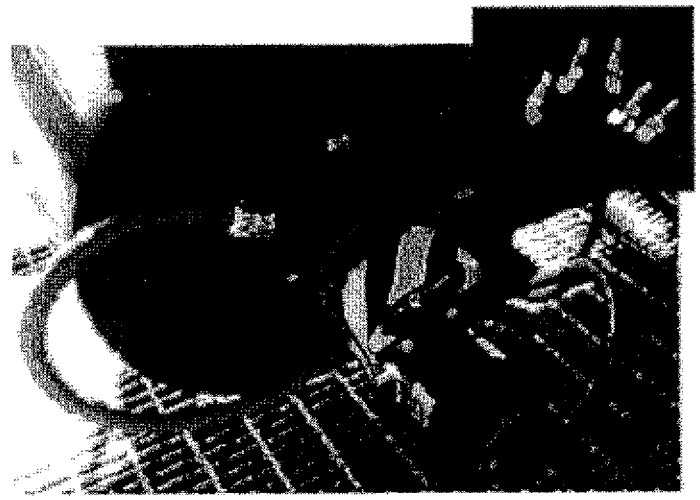
FIG. 1B: Prior Art
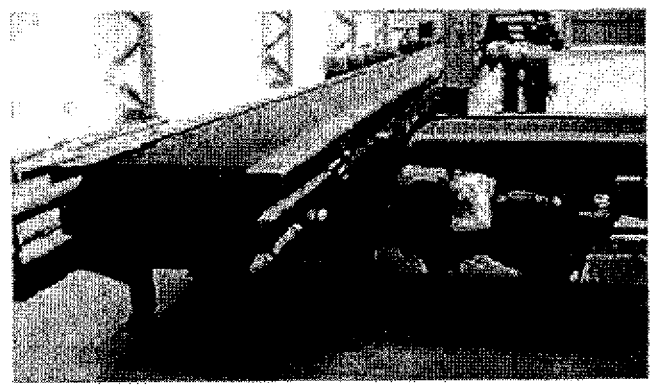
FIG. 2A: Prior Art
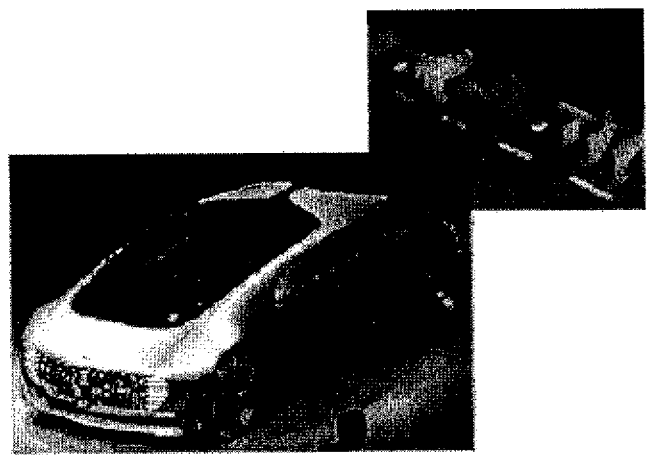
FIG. 2B: Prior Art

⑪

| Description | Types (T) |
|---|---|
| Fan | 1 |
| Electric Motor | 2 |
| Pump | 3 |
| Heater | 4 |
| Others | 5 |

⑫

| Description | Types (T) |
|---|---|
| Longest Lifetime | 1 |
| Maximum Production | 2 |
| Best Balance | 3 |
| Others | 4 |

⑬

| Models (M) | Types (T) | Restrictions (R) |
|---|---|---|
| Fourier Transform | 3 | 2 |
| Bayesian networks | 3 | 1 |
| Decision Trees | 2 | 1 |
| Others | 4 | 3 |

← Bayesian Networks

DYNAMIC AND RECONFIGURABLE SYSTEM MANAGEMENT

TECHNICAL FIELD

The exemplary embodiments of this invention relate generally to optimizing performance of industrial systems, including predictive maintenance thereof, and systems that demand dynamic modifications to their setups in response to environment changes.

BACKGROUND

In general the initial configuration of industrial and other types of systems assumes the system is new, but as conditions change that early configuration may no longer be optimal. Equipment performance can have severe impacts when operation of the equipment is not associated with prescribed goals. For example, in a production line a certain machine can be targeted to perform different behaviors over time, such as targeting autonomy, energy consumption, or minimize maintenance. There is a need to optimize the use of equipment according to the operator's changing needs, as well as to configure user presets or initial setup to target the desired optimization choice.

For example, predictive maintenance is one area in which equipment is frequently monitored in key variables produced by specific sensors that can sense power consumption, vibration, temperature, humidity, and the like. Prior art FIG. 1A illustrates this concept for evaluating a single bearing for lubrication; in an early phase the bearing is new but as it continues in use over time different sensors can evaluate different aspects of the bearing's performance that may indicate a lubrication issue. Some sensors may look at the bearing itself while others look at upstream components such as the oil supply line at prior art FIG. 1B. Eventually with no corrective action the bearing fails, which the final sensor P6 senses as excessive heat. By executing an analysis over these combined monitored data, it is possible to predict which kind of defect the machine would present. In this case, there is an opportunity to dynamically change the machine's behavior in order to minimize such possible failures or to meet another goals in real-time, for example by managing an electronic equipment controller to slow down the speed at which the equipment is operating, thus extending the period necessary to execute the maintenance.

Some relevant teachings in this regard can be seen at the following patent document references.
  US 20140047107 A1—Remote industrial monitoring and analytics using a cloud infrastructure;
  US 20140047064 A1—Remote industrial monitoring using a cloud infrastructure;
  WO 2010120442 A2—Cloud computing as a basis for equipment health monitoring service;
  WO 2011106914 A1—Device monitoring system and method based on cloud computing;
  US 20130212214 A1—Cloud gateway for industrial automation information and control systems; and
  EP 2414956 A2—Cloud computing for an industrial automation and manufacturing system Further relevant teachings in this regard can be seen at the following non-patent documents.
  A review on machinery diagnostics and prognostics implementing condition-based maintenance [*Mechanical Systems and Signal Processing* 20; Andres K. S. Jardine, Daming Lin, & Dragan Banjevic; Elsevier; 2006; pp. 1483-1510];
  Industrial Wireless Sensor Networks: Challenges, Design Principles, and Technical Approaches [*Industrial Wireless Sensor Networks: Challenges, Design Principles, and Technical Approaches*; Gungor, V. C. and Hancke, G. P.; Industrial Electronics, IEEE Transactions on (Volume: 56, Issue: 10); 27 Feb. 2009, pp 4258-4265];
  Wireless Sensor Networks for Industrial Environments, by Kay Soon Low, W. N. N. Win, and Meng Joo Er; [*Computational Intelligence for Modeling, Control and Automation*, 2005 and International Conference on Intelligent Agents, Web Technologies and Internet Commerce, International Conference on (Volume: 2); 28-30 Nov. 2006, Vienna, Austria; pp 271-276];
  Wireless sensor networks for industrial applications, by Xingfa Shen, Zhi Wang and Youxian Sun; [*Intelligent Control and Automation*, 2004. WCICA 2004. Fifth World Congress on (Volume: 4); 15-19 Jun. 2004; pp 3636-3640];
  Wireless sensor network for industrial automation, by M. Yamaji, Y. Ishi, T. Shimamura and S. Yamamota; [*Networked Sensing Systems*, 2008. INSS 2008. 5th International Conference on; 17-19 Jun. 2008, p 253];
  Industrial Control using Wireless Sensor Networks, by K. Khakpour and M. H. Shenassa; [*Information and Communication Technologies: From Theory to Applications*, 2008. ICTTA 2008. 3rd International Conference on; 7-11 Apr. 2008, Damascus, Syria]; and
  Prognostics and health management design for rotary machinery systems—Reviews, methodology and applications [*Mechanical Designs and Signal Processing* 42; Jay Lee, Fangji Wu, Wenyu Zhao, Masoud Ghaffri, Linxia Liao & David Siegel; Elsevier; 2014; pp. 313-334].

SUMMARY

In a first aspect thereof the embodiments of this invention provide a method comprising: storing in a computer-readable memory one or more predictive models that predict behavior of a system and one or more system performance models that control operation of the system; receiving a user criteria for operating the system; selecting one or more of the predictive models in dependence on the user criteria; implementing the selected one or more predictive models to select a subset of sensors that monitor physical conditions of the system and/or environmental parameters thereof; implementing the selected one or more predictive models to select one or more of the system performance models that conform to the user criteria; and controlling one or more actuators associated with the system according to inputs received from the selected subset of sensors and the selected one or more system performance models.

In a second aspect of these teachings there is an apparatus comprising at least one processor and at least one memory tangibly storing executable instructions. In this aspect the at least one processor is configured, with the at least one memory and the executable instructions, to cause the apparatus to perform actions comprising: in response to receiving an input of a user criteria for operating a system, selecting one or more predictive models in dependence on the user criteria, where the predictive models predict behavior of the system and are stored in the one or more memories with one or more system performance models that control operation of the system; implementing the selected one or more predictive models to select a subset of sensors that monitor physical conditions of the system and/or environmental parameters thereof; implementing the selected one or more predictive models to select one or more of the system performance models that conform to the user criteria; and controlling one or more actuators associated with the system according to inputs received from the selected subset of sensors and the selected one or more system performance models.

In a third aspect thereof the embodiments of this invention provide a computer readable memory having tangibly stored therewith program code. In this aspect the program code is executable by a computing system to cause the computing system to perform actions comprising: in response to receiving an input of a user criteria for operating a system, selecting one or more predictive models in dependence on the user criteria, where the predictive models predict behavior of the system and are stored in the one or more memories with one or more system performance models that control operation of the system; implementing the selected one or more predictive models to select a subset of sensors that monitor physical conditions of the system and/or environmental parameters thereof; implementing the selected one or more predictive models to select one or more of the system performance models that conform to the user criteria; and controlling one or more actuators associated with the system according to inputs received from the selected subset of sensors and the selected one or more system performance models

BRIEF DESCRIPTION OF THE DRAWINGS

FIGS. 2A-B respectively illustrate a prior art conveyor belt in a manufacturing process line and a prior art automobile as example machinery that may be controlled and monitored according to certain embodiments of these teachings.

DETAILED DESCRIPTION

Figure 1A:
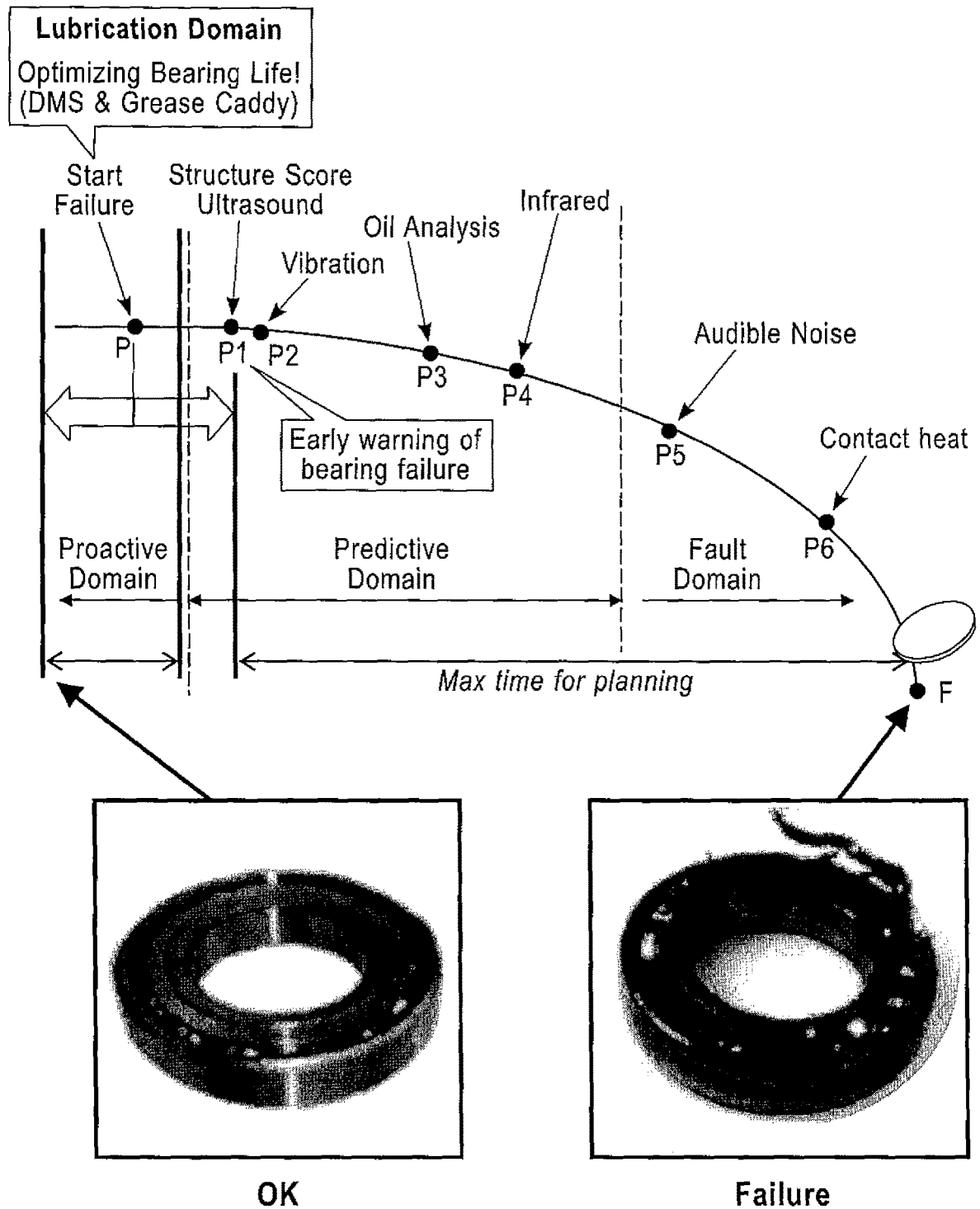
FIG. 1A is a prior art conceptual diagram showing deterioration of a bearing over time as monitored and predicted by various sensors, including sensors apart from the bearing such as at the oil supply fitting of prior art FIG. 1B.

Choosing the correct prediction model for the machine's operation based on user goals/presets (and therefore the specific sensors to be used for this prediction), and under certain restrictions that can change rapidly over time, is important to maximize the efficiency of sophisticated and expensive equipment. This can lead to the minimization of losses via machine failures and/or production inefficiencies, maximizing performance for a given metric such as production volume, maintenance expense or energy consumption for example. The target goals for the prediction model to optimize a process line can change dynamically and could target financial costs, precision, deadline, performance, energy consumption and preventive maintenance, among others. These performance goals are tightly connected to the specialist's knowledge and such decisions should be performed at the right time. Properly designed cognitive computing can also learn this specialist knowledge and apply corrections at the proper time.

As context for the more generalized discussion below, consider two examples of industrial systems that can use these teachings to advantage. An industrial conveyor belt such as that shown at FIG. 2A is one small part of many industrial manufacturing systems of embodiments of these teachings may consider it as its own stand-alone system since it has multiple bearings with lubrication systems, motors for moving the belt and its chassis, the belt itself is subject to wear, and the like. A control/advisory system according to these teachings can detect issues from various sensors and historical data about the system and, based on the goals or model that is dynamically selected, dynamically change the velocity of the belt. Of course if the conveyor belt is only a subset of a larger system, changes to the belt velocity will need to be matched to other portions of the overall system that provide products to the belt and that offtake products from it. The configuration of actuators and sensors can also change to fit the newly chosen models and needs, such as dynamically moving the behavior of the belt from a high producing goal to an energy saving goal which would completely reconfigure the system in real-time.

Another example of an industrial system is an automobile such as shown at FIG. 2B. Embodiments of these teachings can be deployed for driverless vehicles as well as (to only a slightly lesser extent) for human-operated vehicles to dynamically change their behavior to reach a user goal considering equipment conditions. For example, it may be that the selected goal is autonomy according to insights that sensors and models produce to the advisory system of these teachings. Depending on this current goal which may be set by the car system or by the driver, the vehicle's autonomous operation can be maximized and once a different goal is selected the vehicle can be reconfigured for that different goal, for example to maximize performance. These changes and reconfigurations can occur in real time, and online were some internet access is a part of the advisory or control system over the machinery. Another possibility is given that the car system detects traffic jam ahead, automatically sets the system to maximize fuel consumption since performance is not necessary at all on this particular situation.

Embodiments of the subject invention include a dynamic method for equipment management based on a platform for data collection and interpretation, which finds the most appropriate prediction model according to the analyzed scenario and the preset user goals. Such user goals can be for example energy efficiency, performance over time, maximum interval between maintenance events on the equipment, minimum maintenance expense, and the like. The goals that support the predictive model can change dynamically over time, and thus the models can be changed. Different models use different sensors for the equipment and/or different setups of those sensors, and so as the model is changed so is the subset of sensors selected as feedback and/or the initial setup of those selected sensors. While the examples herein are in the context of mechanical systems, industrial systems, electrical systems, systems of devices, software systems, and other systems of devices, those are non-limiting examples and embodiments of these teachings can be deployed to advantage in various types of systems including an arrangement of devices connected according to the internet of things, dynamic system reconfiguration, networked medical devices and biomedical monitors or other wellness sensors that form a system for continuing or preventative healthcare, and so forth. The various components and sensors of the system may be interconnected to one another, and/or to the computing apparatus embodying these teachings, via wired, optical or wireless communication links.

Figure 3:
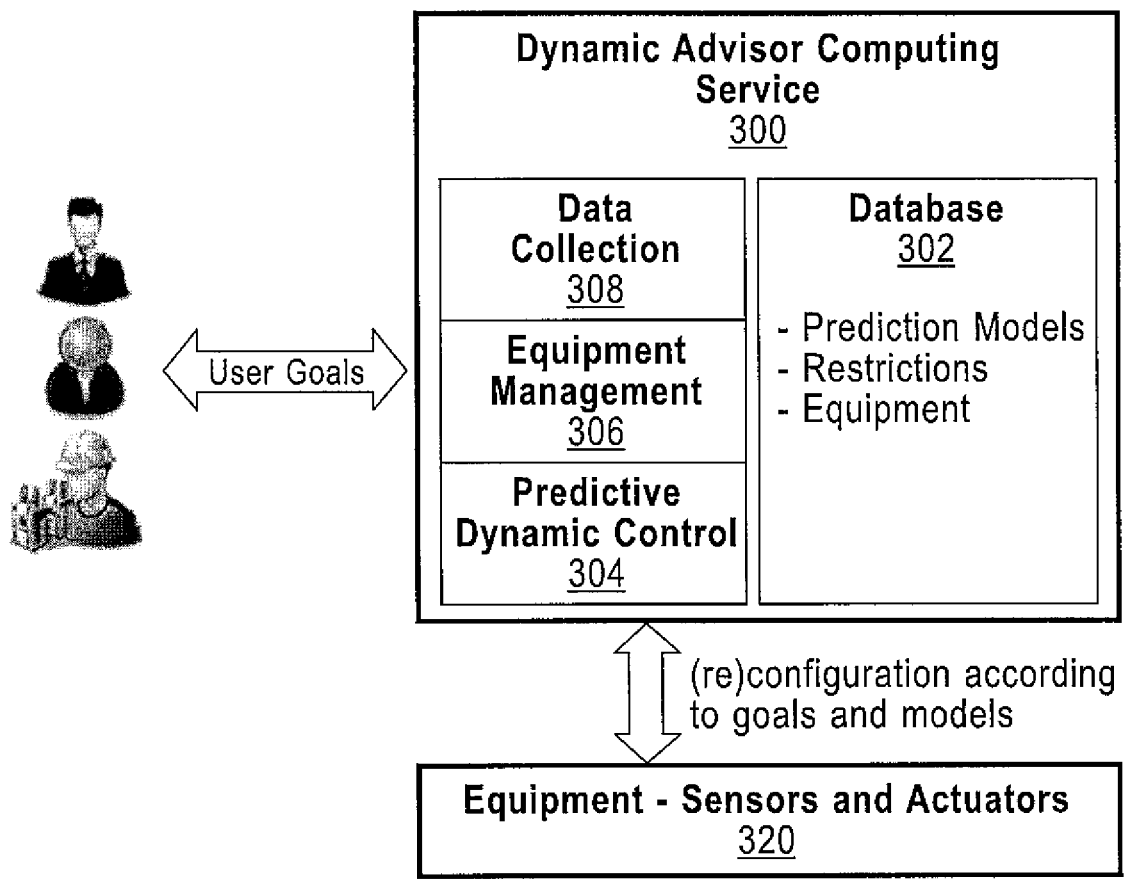
FIGS. 3-4 are schematic diagrams showing different levels of detail for an analytic prediction/advisory system according to embodiments of these teachings.

FIG. 3 is a schematic diagram giving a high level overview of an analytic prediction/advisory system according to these teachings. The analytic prediction/advisory system 300 can be run as a service as FIG. 3 depicts, taking as inputs the user goals to select from the system's database 302 one or more prediction models that are used to in conjunction with performance models for managing equipment 306 to issue control commands 304 for controlling actuators 320 that operate that equipment. Sensors 320 located at or near the equipment provide continual feedback which is collected 308 at the system 300 to measure how the equipment is performing with respect to the prediction models and user goals.

Figure 4:
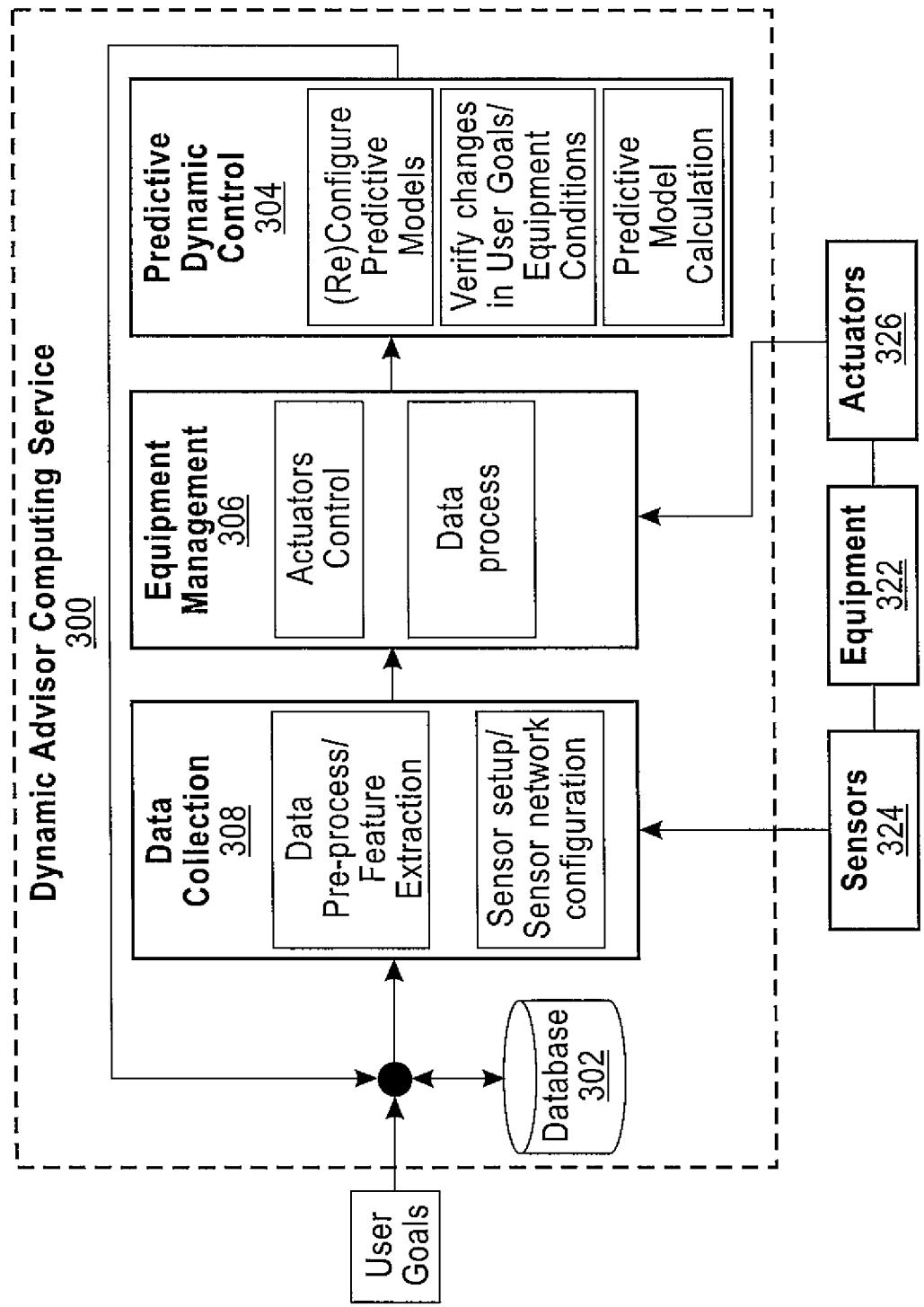
Figure 5:
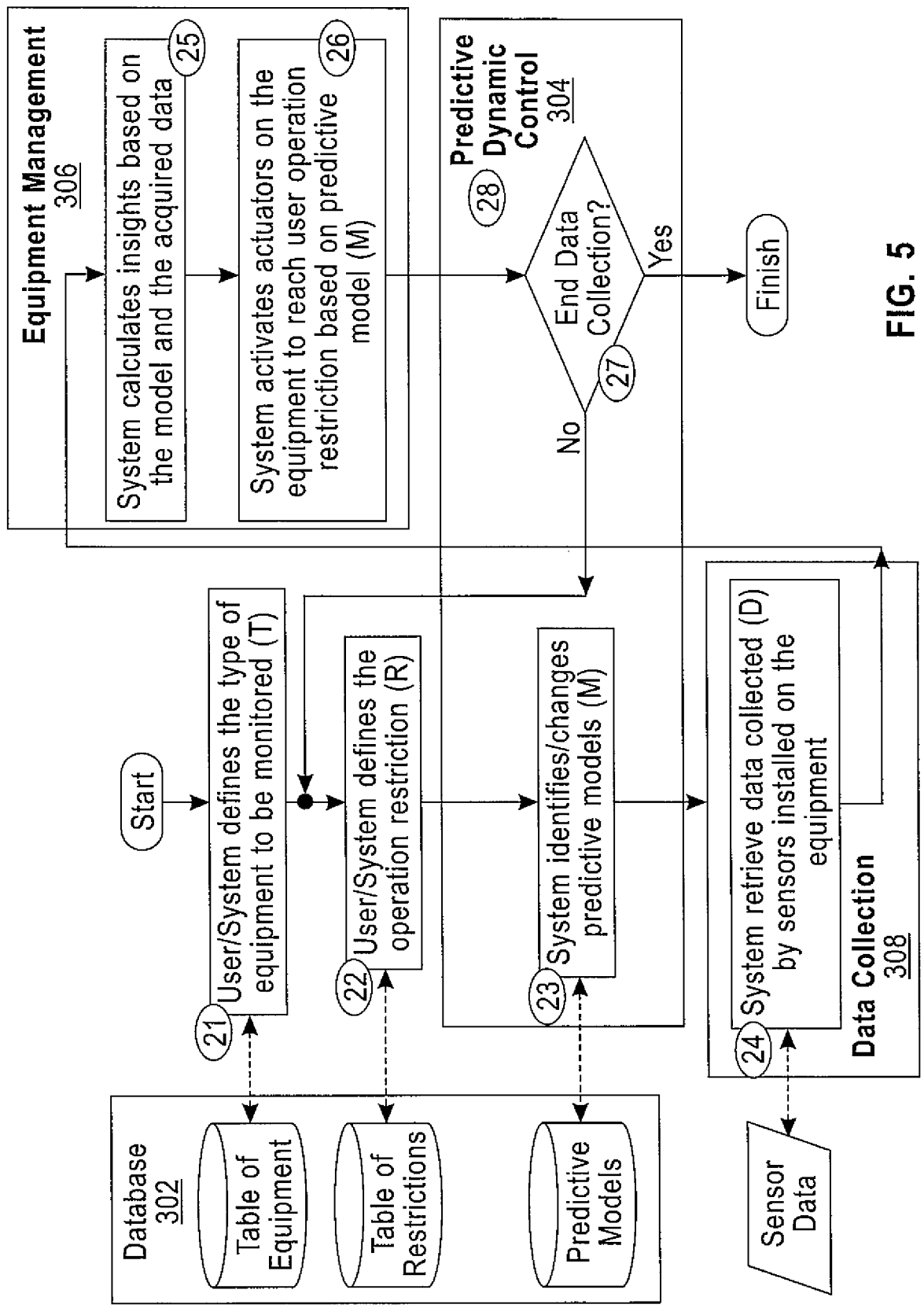
FIG. 5 is a flow diagram illustrating some exemplary steps for operating the system of FIGS. 3-4.

FIG. 4 gives further details of the system of FIG. 3, and FIG. 5 describes steps in operating such a system. The database 302 includes a table of the equipment being monitored, operated and controlled by the system 300, a table of restrictions (for example, maximum speed of the conveyor belt, minimum distance between automobiles for different roadways/speeds, and the like), and the predictive models. At step 21 of FIG. 5 the user defines the type of that equipment that is to be monitored, or the system can define this equipment from the user's goal selection. This step can be also understood as the scenario that will be applied for later analysis, for example, monitoring of an electric motor. At step 22 of FIG. 5 the user defines the operation restriction which are the restrictions involved in the analysis routine. These indicators may include rules such as maximize equipment lifetime, maximize throughput, etc. For example, if the user's goal for the self-driving vehicle is shortest transit time to destination the operation restrictions would reflect that; if the user further selects no toll roads that is an additional restriction. There are a variety of restrictions associated with any given user goal, for example maximum continuous speed of the conveyor belt and electrical system limits for the industrial process line as a whole, roadway speed limits and speed-dependent minimum separation between vehicles, and the like. These are already pre-stored in the database 302 within the table of restrictions and also other restrictions can be inserted in the database over the time (learning process).

Then at step 23 the system identifies and/or modifies a set of predictive models based on the equipment to be monitored and on the operation restriction(s). Based on the metrics defined by the user (e.g., the equipment to be monitored and the operation restriction involved in this analysis project), the system 300 identifies the adequate predictive model from those within its database 302. Data collection 308 occurs at step 24 of FIG. 5 where the system 300 retrieves data collected by the sensors 324 installed on the equipment 322. The data sent by the sensors 324 attached on or near the equipment 322 are collected by a computational unit such as one or more computer processors. One or more stand-alone sensors or a sensor network can be used for this task.

FIG. 5 continues at step 25 with the system 300 calculating insights based on the model selected at step 23 and the data acquired at step 24. Note that some or all of the retrieved data may have been collected prior to the selection of the prediction model at step 23; the system can collect and store data that is initially redorded by the sensors even when it is not actively controlling the various actuators 326 of the equipment. During the monitoring period of step 25, this real-time data and in some embodiments also the historical data is analyzed and classified by the defined/selected predictive model. Then at step 26 the system activates actuators 326 on the equipment 322 to reach the user operation restriction based on the predictive model. The predictive model can provide useful information for better system operation.

Step 27 of FIG. 5 queries whether to end the data collection. While data collection is running, the system 300 keeps looping through steps 24 through 28 of FIG. 5 to continually or periodically analyze the incoming data, and it eventually changes equipment behavior by acting on one or more of the equipment actuators 326 in dependence on the predictive model selected at step 23. This represents an ongoing, steady state operation of the system 300 where neither the user goals nor the selected prediction model is changed. The equipment 322 is not necessarily operated at steady state since the actuators 326 may be tweaked from time to time in dependence on feedback received from the sensors 324 to achieve the performance predicted by the model.

The final step of FIG. 5 is number 28 in which the predictive models are dynamically changed. If during the data analysis that occurs in the loop of steps 24-27, the operation conditions of the monitored device/equipment changes, the defined predictive models can be changed dynamically if necessary, and also the sensors can be configured (if a different subset of sensors is selected with the changed predictive model) or reconfigured (for sensors that are selected both before and after the change to the predictive model). Since in this case the predictive model itself is updated in light of real world conditions and sensor feedback, FIG. 5 shows the process returning to step 22 in case that change to the predictive model might require some new operation restriction, but in any case changing the predictive model can be considered as a new selection at step 23.

One example of configuring the sensors is setting a set point and/or range for the sensors, such that the range can be changed based on an input from the user or more likely from the system itself as it runs the actuators 326 and obtains feedback from the sensors 324. Changes to the predictive model can depend on the 'state' of the equipment, so for example if the equipment is being operated for maximum production volume but temperature or electrical load at a sensor is excessive the predictive model can be adjusted based on the equipment being run in maximum production volume state, whereas a high temperature or load as compared to what the model would predict if the equipment were being run for maximum energy efficiency may not lead to a change to that model since in the latter case the predicted temperature/load may not be near the physical operating limits of the equipment. Other types of predictive models in the database 302 can include user criteria for optimization such as maximum output or maximum equipment lifetime.

As these user inputs change from time to time, the sensors (for example, their set points and ranges, and even the selection of which subset of all the available sensors will be providing feedback) at or near the machinery can be changed to optimize the equipment/machine in a manner that comports with the new user input. There can be other inputs apart from the human inputs also, for example inputs that include information from other machines such as cars on a highway or different machines in a manufacturing plant. In this regard, certain embodiments of these teachings can define a hierarchy of optimization, for example in a manufacturing plant the hierarchy would apply for each of the individual machines and for the entire plant, or for a driverless automobile the hierarchy can be for each of the adjacent cars and for the whole road.

Figures 6A, 6B, 6C:
FIGS. 6A-C illustrate examples of the equipment, restrictions and predictive models that may be stored in the database shown in the systems of FIGS. 3-5.

To further explain the concept FIGS. 6A-C illustrate some specific examples of equipment (FIG. 6A), restrictions (FIG. 6B) and predictive models (FIG. 6C) that may be kept in the system's database 302. If the equipment is categorized by type then a fan may be categorized as cooling equipment (type 1), electric motors might be categorized as operating equipment (type 2), a pump may be categorized as hydraulic equipment (type 3), a heater may be categorized as environmental equipment (type 4), and all other equipment is other (type 5). The operational restrictions may be organized into groups that serve a common goal such as longest equipment lifetime (restriction set 1), maximum production (set 2), best balance between these two (set 3) and others such as maximum energy efficiency or maximum return on operating expense (set 4).

FIG. 6C shows four different predictive models: Fourier Transform, Bayesian networks, Decision Trees, and others. Different ones of these example prediction models are more suitable for different combinations of equipment and goals/restriction; see for example the non-patent document by Jay Lee referenced in the background section above. If for example the hydraulic equipment were selected and the goal was longest lifetime, FIG. 6C shows that Bayesian Networks would be the predictive model that the system 300 selects at step 23 of FIG. 5. Fourier Transform might be selected for managing the hydraulic equipment if the goal were to maximize production, and Decision Trees might be selected to manage the operational equipment if the goal were to operate it for the longest lifetime.

It follows from FIG. 6C that where one instance of the system 300 is controlling a wide variety of equipment such as an entire wafer fabrication process line or an entire driverless vehicle, multiple different prediction models may be selected for controlling/operating different subsets of that equipment towards the same user goal of maximum energy efficiency, or maximum production, or shortest time to destination with no tolls, or the like. As such, it may be that one or more prediction models are selected at step 23 of FIG. 5, each selected model operating different subsets of all the equipment that is being monitored and controlled by the overall system 300.

Some embodiments of these teachings fall within the larger framework of the Internet of Things (IoT). The physical systems of devices and machines are those controlled by the actuators; the control services are the control/advisory system described above and the command outputs to those actuators that the system generates, and as shown these commands can be remotely issued and delivered via cloud services (Internet) as well as directly via a wired or wireless interface to the actuators themselves. The data services collect the sensor data and store the models and restrictions so as to operate with the control serves as described above in more detail. All of this information from multiple devices/machines can be analyzed, using cognitive computing/artificial intelligence even, for a more insightful perspective on actionable improvements such as to the machinery process line or driverless automobile or other system being evaluated, adaptations to the product being produced itself, creating new operating criteria, creating new or updated prediction models, and a host of other improvements that might only become apparent with such a high level view of the data where essentially everything is connected, intelligent, instrumented and possible in the coming IoT age.

For a complex system such as an industrial production line or a self-driving automobile, essentially the continual feedback and improvements that resides in certain embodiments of these teachings can be used reinvent 'older' products and make them intelligent, through instrumentation that is largely enabled by inexpensive microprocessors. In such complex systems, particularly if widely adopted for example across millions of driverless vehicles or millions of home or neighborhood based 3D-printers, there will be deployed a massive sensing capability including both embedded and external sensors that are all connected or connectable via the Internet and Wi-Fi, Bluetooth or other wireless protocols. These millions of systems all being monitored would be generating a volume of data on the order of petabytes, but the actual cost of generating, collecting, processing & storing all this information is relatively inexpensive today and it is widely anticipated that these relative costs will continue to decline in the future.

Certain mega-trends can be identified in the field of equipment/device maintenance since the dawn of the industrial age. Originally all maintenance was reactive; run the machine until something broke or was obviously not working properly. This gave way to scheduled maintenance at regular specified intervals generally specified by equipment manufacturers or based on operational evaluations that periodically looked for specific noticeable discrepancies that were known to be associated with more severe maintenance issues if left unaddressed. More recently we are now monitoring specific conditions on a continuous or near continuous basis and performing maintenance based on actual observations, such as illuminating the engine oil light on a vehicle's instrument panel based on the sensed opacity and viscosity of engine oil that is currently circulating through the automobile's engine. Embodiments of these teachings lay within the current mega-trend of system maintenance, predictive maintenance based on observations of wear, usage, environmental conditions, and a host of other metrics that can be defined, measured, compared, and assessed. Such predictive maintenance can for example find that replacing the circulating lubricating oil for the bearings of FIG. 1A more frequently than previous practice elongates the life of the bearings, which can quickly become significant if there are hundreds of bearings within the machinery being monitored.

In the IoT realm certain embodiments of these teachings include a system and method for suggesting the configuration platform of an IoT-based remote monitoring system. Such a suggested platform can be delivered as a service and the suggestions can be based on mapping that correlates predictive models to sensors. In one regard the system can suggest based on user constraints/restrictions the type of sensors that can be used. In another regard the suggestions can be based on definitions in a service level agreement (SLA) and the system calculates the monitoring time and costs. Over time such a system and method can learn from previous matching and results of analytics, and update the database prediction models it selects for the different user specific scenarios.

Figure 7:
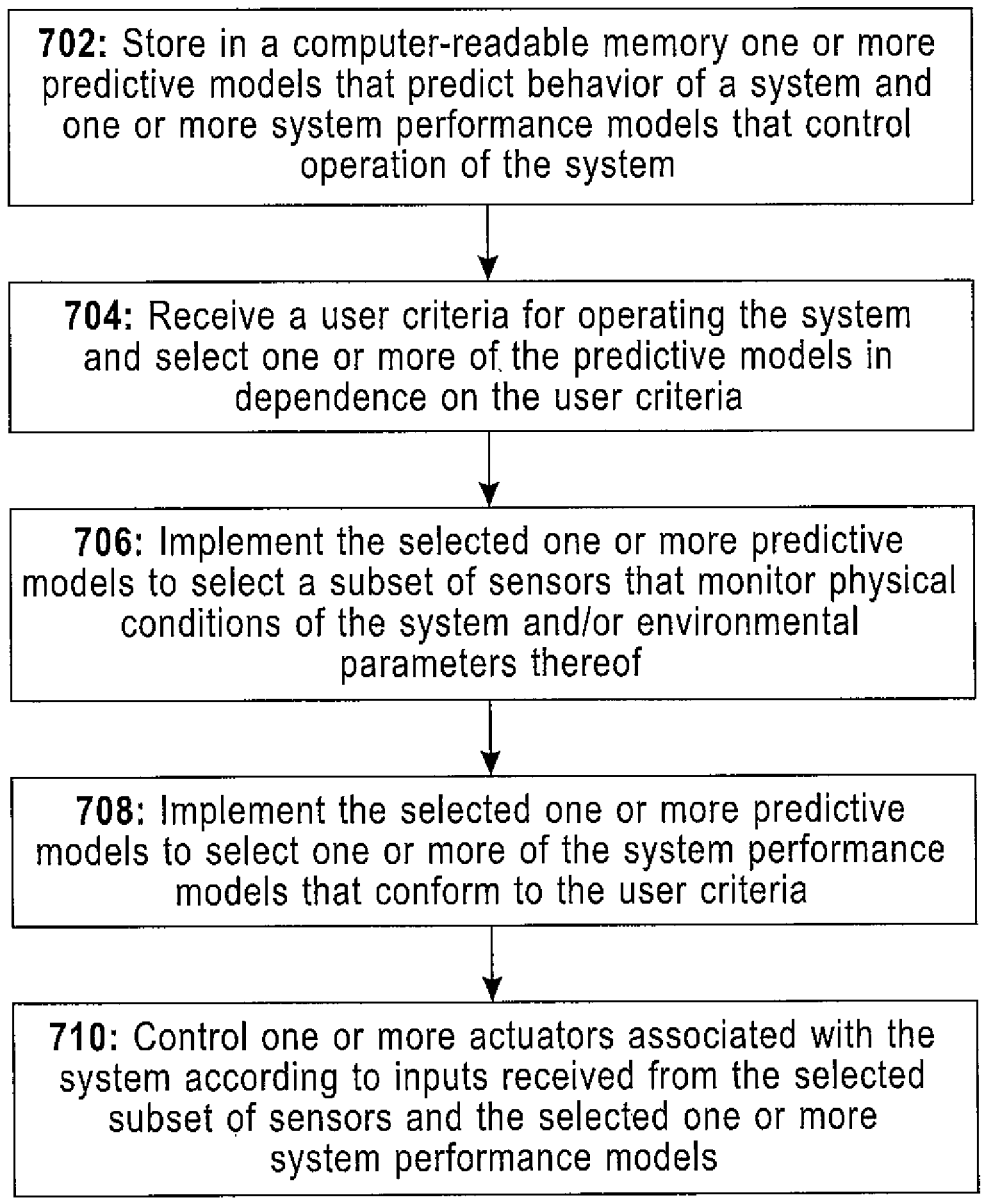
FIG. 7 is a logic flow diagram illustrating a method that encompasses certain features of the embodiments of this invention.

FIG. 7 is a logic flow diagram illustrating a method according to certain non-limiting embodiments of this invention. At block 702 there are stored in a computer-readable memory one or more predictive models that predict behavior of a system and one or more system performance models that control operation of the system. The system can be for example a mechanical system, an industrial system which is a more specific subset of mechanical systems, or a system of devices. At block 704 the prediction system receives a user criteria for operating the system and selects one or more of the predictive models in dependence on that user criteria. Then at block 706 the prediction system implements the selected one or more predictive models to select a subset of sensors that monitor physical conditions of the system and/or environmental parameters thereof, and at block 708 implements the selected one or more predictive models to select one or more of the system performance models that conform to the user criteria. Finally at block 710 the system controls one or more actuators associated with the system according to inputs received from the selected subset of sensors and the selected one or more system performance models.

In some embodiments consistent with FIG. 7 the subset of sensors include at least one of: a visible light, infrared or thermal camera, a pressure sensor, a temperature sensor, a flow sensor, a humidity sensor, a vibration sensor, an chemical sensor (liquid and gas), inductive sensor, capacitive sensor, resistive sensor, fluorescent sensor, wellness sensors, medical sensors, biomedical sensors, and an electric load sensor.

In some embodiments consistent with FIG. 7 the user criteria for operating the system is selected from a set comprising: limit cost to monitor the system, maximize time interval between maintenance on the system, maximize energy efficiency for operating the system, and maximize output from the system.

In some embodiments consistent with FIG. 7, the selected one or more predictive models are dynamically changed based on the inputs received from the selected subset of sensors and a newly received user criteria.

In some embodiments the method of FIG. 7 further includes reconfiguring the selected subset of sensors and/or control inputs to the one or more actuators based on a change to the selected one or more predictive models.

In some embodiments the method of FIG. 7 further includes outputting a recommended change for operating the system based on comparing a prediction by the selected one or more prediction models of the system to a performance goal of the system defined by the user criteria.

And in still other embodiments the method of FIG. 7 further includes monitoring inputs from the selected subset of sensors; and outputting a predicted performance of the system from inputting the monitored inputs to the selected one or more prediction models.

The present invention may be implemented as a system, a method, and/or a computer program product such as a computer readable memory having tangibly stored therewith computer readable program instructions which when executed cause a processor to carry out certain aspects of the present invention.

The computer readable storage medium such as the memory 302 can be a tangible device that can retain and store instructions for use by an instruction execution device (such as the data processor(s) of the computer system). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices and stored at a local computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

We claim:

1. A method comprising:

receiving, by a network device, a user criteria of a user of the network device for operation of a system;

based on the user criteria, implementing a selected one or more predictive models that predict behavior of a system and one or more system performance models to control operation of the system according to goals indicated by the user criteria, wherein one or more actuators for the selected one or more predictive models are adjusted and preset at the network device based on the received user criteria;

based on implementing the selected one or more predictive models:

selecting to use a subset of sensors to perform monitoring physical conditions of the system and/or environmental parameters for the control operation of the system; and selecting to use based on the subset of sensors the one or more system performance models conforming to the user criteria and to use the one or more actuators at the network device to reach user operation goals and user operation restrictions identified for the system based on the one or more predictive models; and based on inputs received from the selected subset of sensors and the one or more actuators at the network device and based on newly received user criteria indicating a change of the physical conditions of the system and/or the environmental parameters, reconfiguring the selected subset of sensors and controlling inputs to the one or more actuators to dynamically change the selected one or more predictive models to optimize the operation of the system.

2. The method according to claim 1, wherein:

the subset of sensors include at least one of: a visible light, infrared or thermal camera, a pressure sensor, a temperature sensor, a flow sensor, a humidity sensor, a vibration sensor, an chemical sensor (liquid and gas), inductive sensor, capacitive sensor, resistive sensor, fluorescent sensor, wellness sensors, medical sensors, biomedical sensors, and an electric load sensor.

3. The method according to claim 1, wherein:

the user criteria for operation of the system is selected based on at least one of a: limit cost to monitor the system, maximize time interval between maintenance on the system, maximize energy efficiency for operation of the system, and maximize output from the system.

4. The method according to claim 1, wherein dynamically changing the selected one or more predictive models causes a different subset of sensors to be monitored and controlled by the operation of the system.

5. The method according to claim 1, wherein the goals indicated by the user criteria comprise:

energy efficiency goals, performance over time goals, and maximum interval between maintenance events goals.

6. The method according to claim 1, further comprising at least one of:

outputting a recommended change for operation of the system based on comparing a prediction by the selected one or more prediction models of the system to a performance goal of the system defined by the user criteria, or outputting a predicted performance of the system from inputting the monitored inputs to the selected one or more prediction models.

7. The method according to claim 1,
wherein the user operation restrictions comprises at least one of:
maximum speed, minimum distance between automobiles for different roadways/speeds, no toll road selection, electrical system limits, roadway speed limits, or a speed-dependent minimum separation between vehicles.

8. An apparatus comprising at least one processor and at least one memory tangibly storing executable instructions, wherein the at least one processor is configured with the at least one memory and the executable instructions to cause the apparatus to perform actions comprising:
in response to receiving an input of a user criteria for operation of a system, implementing a selected one or more predictive models in dependence on the user criteria, where the predictive models predict behavior of the system and are stored in the one or more memories with one or more system performance models that control operation of the system according to goals indicated by the user criteria, wherein one or more actuators for the selected one or more predictive models are adjusted and preset at the apparatus based on the received user criteria;
based on implementing the selected one or more predictive models:
selecting to use a subset of sensors to perform monitoring physical conditions of the system and/or environmental parameters for the control operation of system; and
selecting to use based on the subset of sensors the one or more system performance models conforming to the user criteria and using the one or more actuators at the apparatus to reach user operation goals identified for the system based on the one or more predictive models; and
based on inputs received from the selected subset of sensors and the one or more actuators at the apparatus and based on newly received user criteria indicating a change of the physical conditions of the system and/or the environmental parameters, changing the selected one or more predictive models to optimize the operation of the system comprising, reconfiguring the selected subset of sensors and controlling inputs to the one or more actuators to dynamically change the selected one or more predictive models to optimize the operation of the system.

9. The apparatus according to claim 8, wherein:
the subset of sensors include at least one of: a visible light, infrared or thermal camera, a pressure sensor, a temperature sensor, a flow sensor, a humidity sensor, a vibration sensor, an chemical sensor (liquid and gas), inductive sensor, capacitive sensor, resistive sensor, fluorescent sensor, wellness sensors, medical sensors, biomedical sensors, and an electric load sensor.

10. The apparatus according to claim 8, wherein:
the user criteria for operating the system is selected based on at least one of a: limit cost to monitor the system, maximize/optimize time interval between maintenance on the system, maximize/optimize energy efficiency for operating the system, maximize/optimize system resilience, maximize/optimize reliability, maximizing/optimize life, maximize/optimize safety, maximize/optimize autonomy, and maximize/optimize output from the system.

11. The apparatus according to claim 8, the actions further comprising:
dynamically changing the selection of one or more predictive models based on the inputs received from the selected subset of the all available sensors and the newly received user criteria indicating a change of the physical conditions of the system and/or the environmental parameters, wherein the changed selection of the one or more predictive models causes a different subset of the all available sensors to be monitored and controlled by the operation of the system.

12. The apparatus according to claim 8, wherein the goals indicated by the user criteria comprise:
energy efficiency goals, performance over time goals, and maximum interval between maintenance events goals.

13. The apparatus according to claim 8, the actions further comprising:
outputting a recommended change for operating the system based on comparing a prediction by the selected one or more prediction models of the system to a performance goal of the system defined by the user criteria.

14. The apparatus according to claim 8, the actions further comprising:
monitoring inputs from the selected subset of sensors; and
outputting a predicted performance of the system from inputting the monitored inputs to the selected one or more prediction models.

15. A non-transitory computer readable memory having tangibly stored therewith program code, the program code executable by a computing system to cause the computing system to perform actions comprising:
in response to receiving, at a user equipment, an input of a user criteria for operating a system according to goals indicated by the user criteria, wherein one or more actuators for the selected one or more predictive models are adjusted and preset at the user equipment based on the received user criteria, implementing a selected one or more predictive models in dependence on the user criteria and one or more system performance modules controlling operation of the system according to user criteria, where the predictive models predict and behavior of the system and are stored in the one or more memories with one or more system performance models that control operation of the system;
based on implementing the selected one or more predictive models:
selecting a subset of sensors to perform monitoring physical conditions of the system and/or environmental parameters for the control operation of system; and
selecting to use based on the subset of sensors one or more system performance models conforming to the user criteria and the one or more actuators at the user equipment to reach user operation goals identified for the system based on the one or more predictive models; and
based on inputs received from the selected subset of available sensors and the one or more actuators at the user equipment and based on newly received user criteria indicating a change of the physical conditions of the system and/or the environmental parameters, changing the selected one or more predictive models to optimize the operation of the system, reconfiguring the selected subset of sensors and controlling inputs to one or more actuators associated with the system to dynamically change the selected one or more predictive models to optimize the operation of the system.

16. The non-transitory computer readable memory according to claim 15, wherein:

the subset of sensors include at least one of: a visible light, infrared or thermal camera, a pressure sensor, a temperature sensor, a flow sensor, a humidity sensor, a vibration sensor, an chemical sensor (liquid and gas), inductive sensor, capacitive sensor, resistive sensor, fluorescent sensor, wellness sensors, medical sensors, biomedical sensors and an electric load sensor.

17. The non-transitory computer readable memory according to claim 15, wherein:

the user criteria for operating the system is selected based on at least one of a: limit cost to monitor the system, maximize/optimize time interval between maintenance on the system, maximize/optimize energy efficiency for operating the system, maximize/optimize system resilience, maximize/optimize reliability, maximizing/optimize life, maximize/optimize safety, maximize/optimize autonomy, and maximize/optimize output from the system.

18. The non-transitory computer readable memory according to claim 15, the actions further comprising:

dynamically changing the selection of one or more predictive models based on the inputs received from the selected subset of the all available sensors and the newly received user criteria indicating a change of the physical conditions of the system and/or the environmental parameters, wherein the changed selection of the one or more predictive models causes a different subset of the all available sensors to be monitored and controlled by the operation of the system.

19. The non-transitory computer readable memory according to claim 15, wherein the goals indicated by the user criteria comprise:

energy efficiency goals, performance over time goals, and maximum interval between maintenance events goals.

20. The non-transitory computer readable memory according to claim 15, the actions further comprising:

outputting a recommended change for operating the system based on comparing a prediction by the selected one or more prediction models of the system to a performance goal of the system defined by the user criteria.

* * * * *